United States Patent Office 2,966,488
Patented Dec. 27, 1960

2,966,488

SUBSTITUTED ALKYLAMINOPURINES

William Shive, 843 E. 38th St., and Charles G. Skinner, Jr., 4405 Duval St., both of Austin, Tex.

No Drawing. Filed July 30, 1956, Ser. No. 600,676

3 Claims. (Cl. 260—252)

This invention relates to substituted purines and more particularly to 6-(carbocyclic-substituted alkyl)aminopurines.

The compounds of the present invention can be represented by the formula

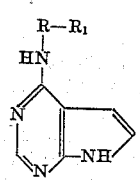

wherein R represents a divalent alkyl radical having from 1 to 11 carbon atoms, and $R_1$ represents a carbocyclic radical of the group consisting of phenyl, naphthyl, and cycloalkyl radicals having from 5 to 6 carbon atoms. Illustrative of the compounds of the invention are 6-benzylaminopurine, 6-(2-α-naphthylethyl)aminopurine, 6-(2-cyclopentylethyl)aminopurine, 6-(3-cyclohexylpropyl)aminopurine, 6-(4-phenylbutyl) aminopurine, 6-(2-phenylbutyl)aminopurine, 6-(5-phenylpentyl)aminopurine, 6-(7-phenylheptyl(aminopurine, 6-(10-phenyldecyl) aminopurine and 6-(11-phenylundecyl)aminopurine.

The 6-(substituted alkyl)aminopurines are white, crystalline compounds which are soluble in certain organic solvents, such as ethanol and the like, and relatively insoluble in water. Because they are amphoteric in nature, they are also soluble in aqueous acid or alkaline solutions.

The compounds of the invention are conveniently prepared by condensing an excess of a selected carbocyclic-substituted alkylamine with 6-methylthiopurine, or with 6-chloropurine. The intermediate 6-methylthiopurine can be prepared by the method of Elion et al., J. Am. Chem. Soc. 74, 413 (1952), and the preparation of 6-chloropurine is described in United States Letters Patent 2,746,961, patented May 22, 1956.

The compounds of the invention are useful in effecting changes in plant physiology: For example, application of a compound of the invention to leaves causes increased leaf growth. Likewise, the compounds can bring about germination of dormant seeds. Thus, the compounds are characterized by a kinetin-like activity. The compounds are most conveniently applied to plants or portions thereof in aqueous solution or suspension, e.g., an aqueous suspension of the compound selected is treated by dropwise addition of dilute aqueous alkali until the solid dissolves; the solution is then diluted with a buffer or dilute aqueous mineral acid is added carefully until the solution is substantially neutral. Alternatively the selected carbocyclic-substituted alkylaminopurine is dissolved in a minimum amount of warm ethanol and then poured into the aqueous solution to be employed. A suspension of fine particles of the compound in the diluent results. Solutions or dispersions thus prepared can be applied by spraying or dipping and the like.

The preparation and properties of the compounds of the invention are further illustrated by the following specific examples.

EXAMPLE 1

*Preparation of 6-benzylaminopurine*

A mixture of 200 mg. of 6-methylthiopurine and 400 mg. of benzylamine contained in a sealed tube was heated at about 130° C. for about thirteen hours. After cooling, the tube was opened and the slightly yellowish crystalline residue contained therein was washed with ice cold ethanol and recrystallized from the minimum amount of warm ethanol.

After recrystallization from ethanol and drying, 6-benzylaminopurine thus prepared melted at about 229° C. with decomposition.

EXAMPLE 2

*Preparation of 6-(β-phenylethyl)aminopurine*

The procedure of Example 1 was repeated except that β-phenylethylamine was employed.

6-(β-phenylethyl)aminopurine thus prepared melted at about 239–240° C. with decomposition, after recrystallization from ethanol.

EXAMPLE 3

*Preparation of 6-(3-phenylpropyl)aminopurine*

3-phenylpropylamine was prepared as follows: To a mixture of one part of 3-phenylpropionitrile, about 2.5 parts of 95 percent ethanol and one part of concentrated ammonium hydroxide was added about one part of wet Raney nickel catalyst and the reaction mixture was hydrogenated at about 50 pounds pressure at room temperature and with shaking, until the calculated amount of hydrogen had been absorbed. The reaction mixture was decanted from the catalyst, the catalyst was washed with alcohol and the combined decantate and washings were acidified to about pH 1 by addition of hydrochloric acid. The alcohol was removed from the acidified mixture by evaporation under reduced pressure and the aqueous residue was cooled and made basic with solid sodium hydroxide. The oily 3-phenylpropylamine formed by reduction of the nitrile, which was thus liberated from its hydrochloric acid addition salt, was extracted with ether and the ether extract was dried over anhydrous calcium sulfate. After evaporation of the ether, the 3-phenylpropylamine was purified by distillation under reduced pressure and boiled at about 104–105° C. at a pressure of about 15 mm. of mercury.

The procedure of Example 1 was repeated except that 3-phenylpropylamine prepared as set forth above was used and the mixture was heated in the sealed tube for about eighteen hours at 130° C.

After recrystallization from ethanol, the 6-(3-phenylpropyl)aminopurine thus prepared melted at about 189–190° C. with decomposition.

EXAMPLE 4

*Preparation of 6-(2-phenylpropyl)aminopurine*

The procedure of Example 1 was repeated using 2-phenylpropylamine instead of benzylamine, and the reaction mixture was heated for about eighteen hours at about 140° C. The product was recrystallized from dilute ethanol.

6-(2-phenylpropyl)aminopurine thus prepared melted at about 182–183° C. with decomposition.

EXAMPLE 5

*Preparation of 6-(4-phenylbutyl)aminopurine*

4-phenylbutylamine was prepared from 4-phenylbutyronitrile using the same technique as set forth in Example 3.

The 4-phenylbutylamine thus prepared boiled at about 114–115° C. at a pressure of 14 mm. of mercury.

The procedure of Example 1 was repeated, using 4-phenylbutylamine prepared as set forth above and heating the mixture in the sealed tube for about eighteen hours at about 140° C. After cooling and opening the tube the residue was recrystallized from ethanol.

After recrystallization from ethanol and drying, 6-(4-phenylbutyl)aminopurine thus prepared melted at about 161–164° C. with decomposition.

EXAMPLE 6

*Preparation of 6-(5-phenylpentyl)aminopurine*

By following the procedure of Example 3, 5-phenylpentylamine was prepared by the reduction of 5-phenylvaleronitrile, and the amine boiled at about 135–136° C. at the pressure of 10 mm. of mercury.

Using the 5-phenylpentylamine thus prepared, the procedure of Example 1 was repeated except that the reaction mixture was heated in a sealed tube for about fifteen hours at about 140° C.

After recrystallization from ethanol and drying, the 6-(5-phenylpentyl)aminopurine thus prepared melted at about 174–176° C. with decomposition.

EXAMPLE 7

*Preparation of 6-(7-phenylheptyl)aminopurine*

Using the procedure of Gardner et al., J. Am. Chem. Soc. 74, p. 5527 (1952), 7-phenylheptanoic acid was prepared from cinnamaldehyde and ethyl ethylidenemalonate. By treatment with a slight excess of thionyl chloride, the 7-heptanoic acid was converted to the corresponding acid chloride, and the crude acid chloride was treated with cold concentrated aqueous ammonium hydroxide whereupon the corresponding 7-phenylheptanoic acid amide, melting at about 82–85° C. was recovered. The amide was dissolved in ether and reduced with lithium aluminum hydride in the usual manner, the resulting amine being recovered by fractional distillation under reduced pressure. The 7-phenylheptylamine thus prepared boiled at about 158–160° C. at the pressure of 15 mm. of mercury.

The procedure of Example 1 was repeated using 7-phenylheptylamine and the reaction mixture was heated in a sealed tube for about sixteen hours at about 140° C.

After recrystallization from ethanol and drying, the 6-(7-phenylheptyl)aminopurine thus prepared melted at about 129–134° C., with decomposition.

EXAMPLE 8

*Preparation of 6-(11-phenylundecyl)aminopurine*

11-phenylundecylamine was prepared by the procedure set forth in Example 7, whereby 11-phenylundecanoic acid was treated with a slight excess of thionyl chloride to produce 11-phenylundecanoyl chloride, which upon treatment with concentrated aqueous ammonium hydroxide gave the corresponding 11-phenylundecylamide melting at about 42–44° C. The amide was dissolved in ether and reduced with lithium aluminum hydride, and the 11-phenylundecylamine which was formed in the reaction was recovered by fractional distillation. The 11-phenylundecylamine thus prepared boiled at about 145–149° C. at the pressure of 2 mm. of mercury.

The procedure of Example 1 was repeated using 11-phenylundecylamine. The reaction mixture was recrystallized from water containing a small amount of acetic acid.

After recrystallization from water, 6-(11-phenylundecyl)aminopurine thus prepared was a white somewhat waxy material which melted with decomposition.

EXAMPLE 9

*Preparation of 6-(2-α-naphthylethyl)aminopurine*

The procedure of Example 1 was followed, except that α-naphthylethylamine was used and the reaction mixture was heated at about 140° C. for about fifteen hours.

After recrystallization from ethanol, 6-(2-α-naphthylethyl)aminopurine thus prepared melted at about 231–234° C. with decomposition.

EXAMPLE 10

*Preparation of 6-(α-naphthylmethyl)aminopurine*

Using α-naphthylmethylamine, the procedure of Example 1 was repeated except that the reaction mixture was heated in a sealed tube for about eighteen hours at about 140° C.

After recrystallization from alcohol, the 6-(α-naphthylmethyl)aminopurine thus prepared melted at about 258–259° C. with decomposition.

EXAMPLE 11

*Preparation of 6-(5-α-naphthylpentyl)aminopurine*

5-α-naphthylpentylamine was prepared by the procedure set forth in Example 7, whereby α-naphthylcarboxaldehyde was condensed with ethyl ethylidenemalonate to yield the corresponding 5-α-naphthylpentanoic acid which was then converted to the 5-α-naphthylpentylamine which boiled at about 151–153° C. at a pressure of 1 mm. of mercury.

The procedure of Example 1 was repeated using 5-α-naphthylpentylamine and the reaction mixture was heated in a sealed tube for about nineteeen hours at about 140° C.

After recrystallization from ethanol and drying the 6-(5-α-naphthylpentyl)aminopurine thus prepared melted at about 158–160° C. with decomposition.

EXAMPLE 12

*Preparation of 6-(4-cyclohexylbutyl)aminopurine*

4-cyclohexylbutylamine was prepared from 4-cyclohexylbutyronitrile using the same technique as set forth in Example 3. The 4-cyclohexylbutylamine thus prepared boiled at about 73° C. at a pressure of 1 mm. of mercury.

The procedure of Example 1 was repeated, using 4-cyclohexylbutylamine prepared as set forth above and heating the reaction mixture in a sealed tube for about eighteen hours at about 140° C. After recrystallization from ethanol-water the 6-(4-cyclohexylbutyl)aminopurine thus prepared melted at about 187–188° C. with decomposition.

EXAMPLE 13

*Preparation of 6-(6-cyclohexylhexyl)aminopurine*

By following the procedure of Example 3, 6-cyclohexylhexylamine was prepared by the reduction of 6-cyclohexylhexanonitrile, and the amine thus prepared boiled at about 104–122° C. at a pressure of 3 mm. of mercury.

Using the 6-cyclohexylhexylamine thus prepared, the procedure of Example 1 was repeated except that the reaction mixture was heated in a sealed tube for about sixteen hours at about 140° C.

After recrystallization from ethanol-water containing a trace of acid, the 6-(6-cyclohexylhexyl)aminopurine thus prepared melted at about 146–150° C. with decomposition.

We claim:
1. The compound 6-(4-cyclohexylbutyl)aminopurine.
2. The compound 6-(6-cyclohexylhexyl)aminopurine.
3. A compound represented by the formula:

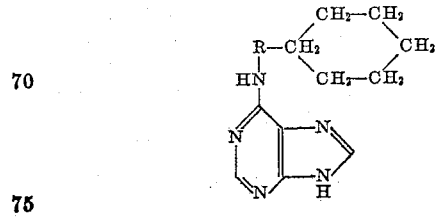

in which R represents an alkylene radical having 4 to 6 carbon atoms inclusive.

References Cited in the file of this patent

UNITED STATES PATENTS

| | | |
|---|---|---|
| 2,691,654 | Hitchings et al. | Oct. 12, 1954 |
| 2,705,715 | Baker et al. | Apr. 5, 1955 |
| 2,844,576 | Goldman et al. | July 22, 1958 |

FOREIGN PATENTS

| | | |
|---|---|---|
| 744,865 | Great Britain | Feb. 15, 1956 |

OTHER REFERENCES

Elion et al.: J. Am. Chem. Soc., vol. 74 (1952), pp. 411–414.

Miller et al.: J. Am. Chem. Soc., vol. 77, p. 1392 (1955).

UNITED STATES PATENT OFFICE
CERTIFICATION OF CORRECTION

Patent No. 2,966,488                 December 27, 1960

William Shive et al.

It is hereby certified that error appears in the above numbered patent requiring correction and that the said Letters Patent should read as corrected below.

Column 1, lines 20 to 28, the formula should appear as shown below instead of as in the patent:

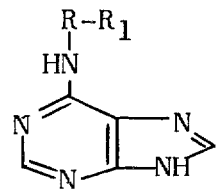

Signed and sealed this 23rd day of May 1961.

(SEAL)
Attest:

ERNEST W. SWIDER                 DAVID L. LADD
Attesting Officer                 Commissioner of Patents